United States Patent [19]

Nagai

[11] Patent Number: 4,616,902
[45] Date of Patent: Oct. 14, 1986

[54] COMPOSITE FILTER, OBSERVATION SYSTEM AND FILAMENTARY DISPLAY DEVICE

[76] Inventor: Kiyoshi Nagai, 228-91, Sachigawa, Oomiya-shi, Japan

[21] Appl. No.: 629,317

[22] Filed: Jul. 10, 1984

[30] Foreign Application Priority Data

Jul. 12, 1983 [JP] Japan ................................ 58-126576
Jul. 12, 1983 [JP] Japan ........................... 58-107934[U]
Jul. 12, 1983 [JP] Japan ........................... 58-107935[U]

[51] Int. Cl.$^4$ ................................................ G02B 5/22
[52] U.S. Cl. ........................................ 350/316; 350/1.6
[58] Field of Search ......................... 350/1.1, 1.6, 316; 250/505.1, 330

[56] References Cited

U.S. PATENT DOCUMENTS 2,418,605  4/1947  Shepherd, Jr. et al. ............. 350/1.1
2,525,638  10/1950  Blout et al. ....................... 250/505.1

Primary Examiner—Carolyn E. Fields
Attorney, Agent, or Firm—Frishauf, Holtz, Goodman & Woodward

[57] ABSTRACT

A composite filter (i) which transmits starlight radiation having a wavelength of 400 up to but not including 600 nm and (ii) does not transmit radiation having a wavelength of 600 to 900 nm comprising at least one organic film filter and at least one glass filter, in which said organic film filter absorbs light radiation having a wavelength of 600–700 nm and said glass filter comprises a glass plate colored with a cobalt-containing salt which absorbs light radiation having a wavelength of 700–900 nm.

9 Claims, 4 Drawing Figures

COMPOSITE FILTER, OBSERVATION SYSTEM AND FILAMENTARY DISPLAY DEVICE

BACKGROUND OF THE INVENTION

1. Field of the Invention

This invention relates to a composite filter, an observation system for dark field utilizing said composite filter, and a filamentary display device provided with said composite filter.

2. Description of Prior Arts

A technology of detecting an image in a dark field such as a dark night with no moonlight has been recently developed. This technology utilizes starlight as the light source and its detection system contains a multi-channeled plate and a photoelectric conversion element which matches with the starlight source.

It is known that the earth goes through space in which approx. a hundred thousand stars are dispersed, for one day. Although most of the stars emit light, the ultraviolet (UV) rays emitted by new-born stars (age: 100,000–1,000,000 years old) are scattered or absorbed in atmospheric gas, etc. so that the UV rays hardly reach the surface of the earth. On the contrary, the near infrared (IR) rays emitted by stars of approximately $5 \times 10^6$ years old reach the surface of the earth. The spectrum of light emitted by the stars and received by the earth is shown in FIG. 1 as the curve (i). Accordingly, the photoelectric conversion element employed in the system has, for instance, such photoelectric conversion characteristics as shown in FIG. 1 as the curve (ii).

The observation system utilizing the starlight has been developed and now employed generally in the military and police works because such observation system needs no employment of artificial light.

Since the observation system now utilizes a multi-channeled secondary electron multiplier, the gain is at very high level. The detection device employed for the observation system contains a number of artificial light sources such as a lighting device, various display devices, etc., most of which emit light having a radiation spectrum overlapping in part with the radiation spectrum of starlight. Generally, the luminance of light emitted by these artificial light sources is several millions times to several ten millions times as high as that of the starlight. Therefore, if any light of the artificial light souce is incidentally received in the visual field directed to eyes of the observer, such light not only causes noise but also the highly amplified artificial light causes burning and further destroys the retina of the observer's eyes.

SUMMARY OF THE INVENTION

The present invention has an object to provide a composite filter which is capable of rendering the dark field observation system substantially free from the above-described drawbacks and dangerous phenomena.

Another object of the invention is to provide an observation system for dark field substantially free from the above-described drawbacks and dangerous phenomena.

A further object of the invention is to provide a filamentary display device which hardly causes the above-described drawbacks and dangerous phenomena light from the display device happens to enter into the visual field of the observation system.

The present invention provides a composite filter for intercepting light of the radiation spectrum in the region of 600–900 nm comprising at least one organic film filter and at least one glass filter, in which said organic film filter absorbs light of a radiation spectrum in the region of 600–700 nm and said glass filter absorbs light of a radiation spectrum in the region of 700–900 nm.

The present invention further provides an observation system for dark field utilizing said composite filter, and a filamentary display device provided with said composite filter thereon.

DETAILED DESCRIPTION OF THE INVENTION

The composite filter provided by the present invention is designed for intercepting light of a radiation spectrum in the region of 600–900 nm, and which comprises at least one organic film filter and at least one glass filter.

The organic film filter absorbs light of a radiation spectrum in the region of 600–700 nm and can be prepared, for instance, from an organic polymer such as cellulose derivative (e.g., cellulose diacetate, cellulose triacetate, etc.) dyed with an appropriate dye having an absorption spectrum in the region of 600–700 nm. Examples of the appropriate dye include Zapon BG First (trade name, available from BASF A.G). The dye can be employed singly or in combination, the latter being adoptable for adjusting the absorption spectrum to a more appropriate region.

The organic film filter generally has a thickness in the range of 0.01–2 mm, more preferably in the range of 0.1–0.5 mm. Such organic film filter can be prepared by coating an solution containing the organic polymer, a plasticizer (if desired), and dye on a suitable support such as glass plate or plastic plate. Otherwise, the organic film filter can be prepared directly on the glass filter.

The glass filter absorbs light of a radiation spectrum in the region of 700–900 nm, and can be a glass plate colored with a cobalt-containing salt or other coloring material having an absorption spectrum in the region of 700–900 nm. The glass plate generally is phosphate glass. The coloring material can be employed singly or in combination, the latter being useful for adjusting the absorption spectrum to a more appropriate region.

The glass filter generally has a thickness in the range of 0.1–10 mm, more preferably in the range of 0.5–5 mm. Such glass filter can be prepared in a conventional manner.

The composite filter of the present invention can be prepared by directly forming the organic film filter on the glass filter. Otherwise, the independently prepared organic film filter and the glass filter can be combined in layers, preferably, by means of an adhesive. Examples of the adhesive include epoxy resin adhesives and other known adhesives employable for combining a glass plate with a plastic film.

The composite filter can be provided in the observation system for preventing the visual field from receiving the aforementioned artificial light such as those emitted by an illuminating device, a lighting device, a display device, a television-type monitor, etc. For instance, the composite filter can be provided on transparent faces of such devices for effectively intercepting (or shielding) the light having the radiation spectrum in the region of 600-900 nm.

EXAMPLE

Figure 3:
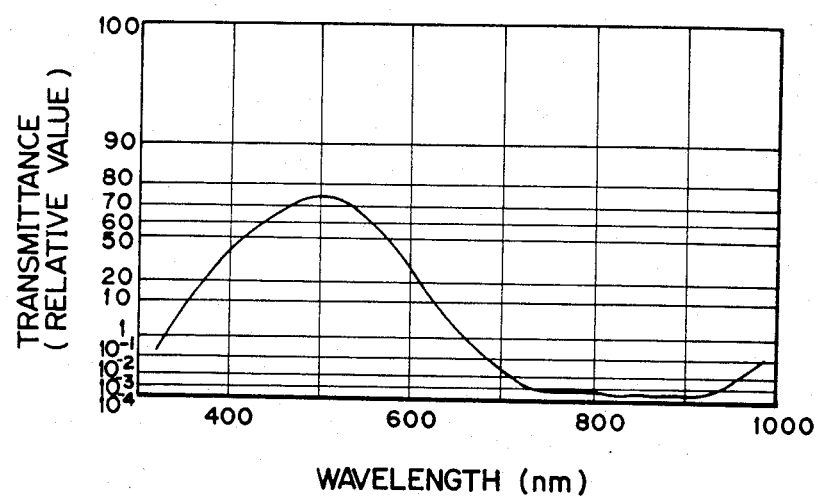
FIG. 3 shows a representative absorption spectrum of the glass filter.

A glass filter (thickness: 3 mm) was prepared in a conventional manner from a phosphate glass and a cobalt salt. The absorption spectrum of the prepared glass filter is given in FIG. 3.

Independently, an organic film filter was prepared by coating on a glass plate a polymer solution of 2 kg. of cellulose diacetate, 20 g. of dibutyl phthalate and 1 g. of Zapon BG First in 1.5 l of butyl acetate. The absorption spectrum of the prepared organic film filter (thickness: 0.3 mm) is given in FIG. 2 as $P_1$.

Figure 2:
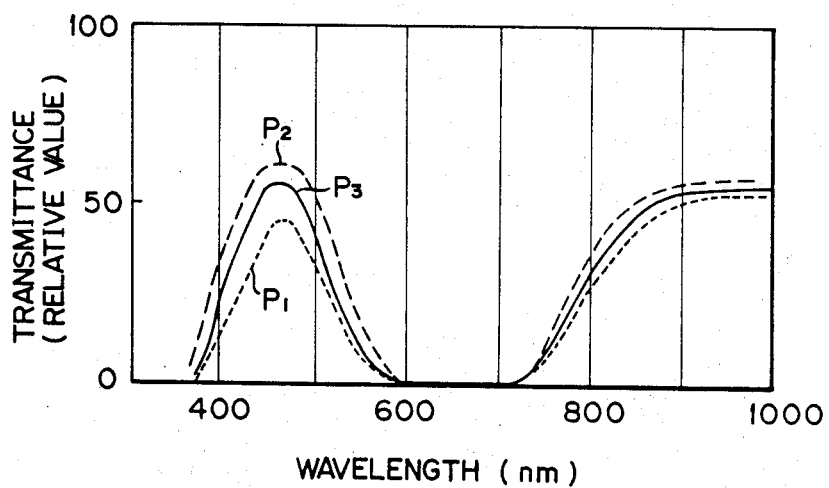
FIG. 2 shows representative absorption spectra of the organic film filter.

$P_2$ and $P_3$ in FIG. 2 are absorption spectra of organic film filters prepared in the same manner except that the amount of the dye was slightly decreased.

Figure 1:
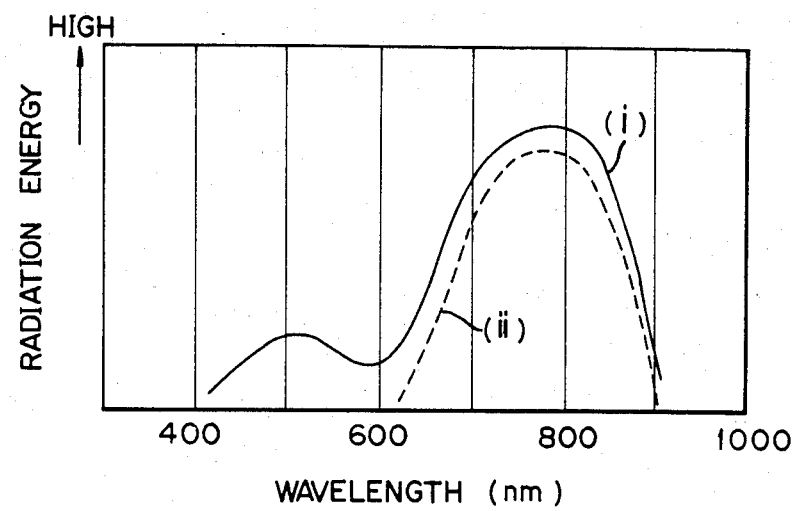
FIG. 1 are spectra in which (i) shows a radiation spectrum of light emitted by the stars and received by the earth, and (ii) shows representative photoelectric conversion characteristics.
Figure 4:
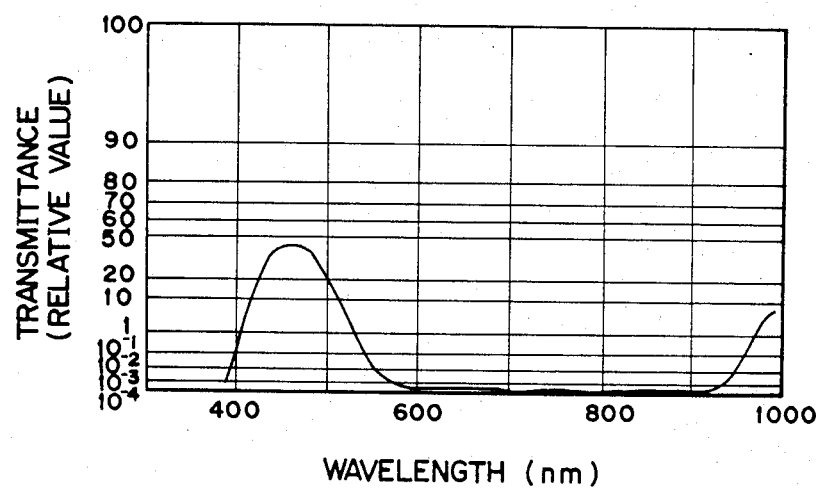
FIG. 4 shows a representative absorption spectrum of the composite filter according to the present invention.

The glass filter and the organic film filter (having the spectrum $P_1$) were combined by an epoxy resin adhesive to prepare a composite filter. The absorption spectrum of the obtained composite filter is given in FIG. 4. As is apparent from comparison between the radiation spectrum of the light emitted by stars and received by the earth (i) in FIG. 1 and the absorption spectrum of the composite filter in FIG. 4, the obtained composite filter is appropriate for intercepting the starlight at the radiation spectrum in the region of 600-900 nm.

I claim:

1. A composite filter (i) which transmits starlight radiation having a wavelength of 400 up to but not including 600 nm and (ii) does not transmit radiation having a wavelength of 600 to 900 nm comprising at least one organic film filter and at least one glass filter, in which said organic film filter absorbs light radiation having a wavelength of 600-700 nm and said glass filter comprises a glass plate colored with a cobalt-containing salt which absorbs light radiation having a wavelength of 700-900 nm.

2. The composite filter as claimed in claim 1, in which said organic film filter comprises a dyed cellulose derivative.

3. The composite filter as claimed in claim 2, in which said dyed cellulose derivative is a dyed cellulose diacetate or a dyed cellulose triacetate.

4. The composite filter as claimed in claim 1, in which said organic filter has a thickness in the range of 0.01-2 mm.

5. The composite filter as claimed in claim 1, in which said glass filter has a thickness of 0.1-10 mm.

6. The composite filter as claimed in claim 1, in which said glass filter is a phosphate glass containing a cobalt-containing salt.

7. The composite filter as claimed in claim 1, in which said organic filter has a thickness in the range of 0.01-2 mm, said glass filter has a thickness of 0.1-10 mm and is a phosphate glass containing a cobalt-containing salt.

8. The composite filter as claimed in claim 7, in which said organic film filter comprises a dyed cellulose derivative.

9. The composite filter as claimed in claim 8, in which said dyed cellulose derivative is a dyed cellulose diacetate or a dyed cellulose triacetate.

* * * * *